1,782,561

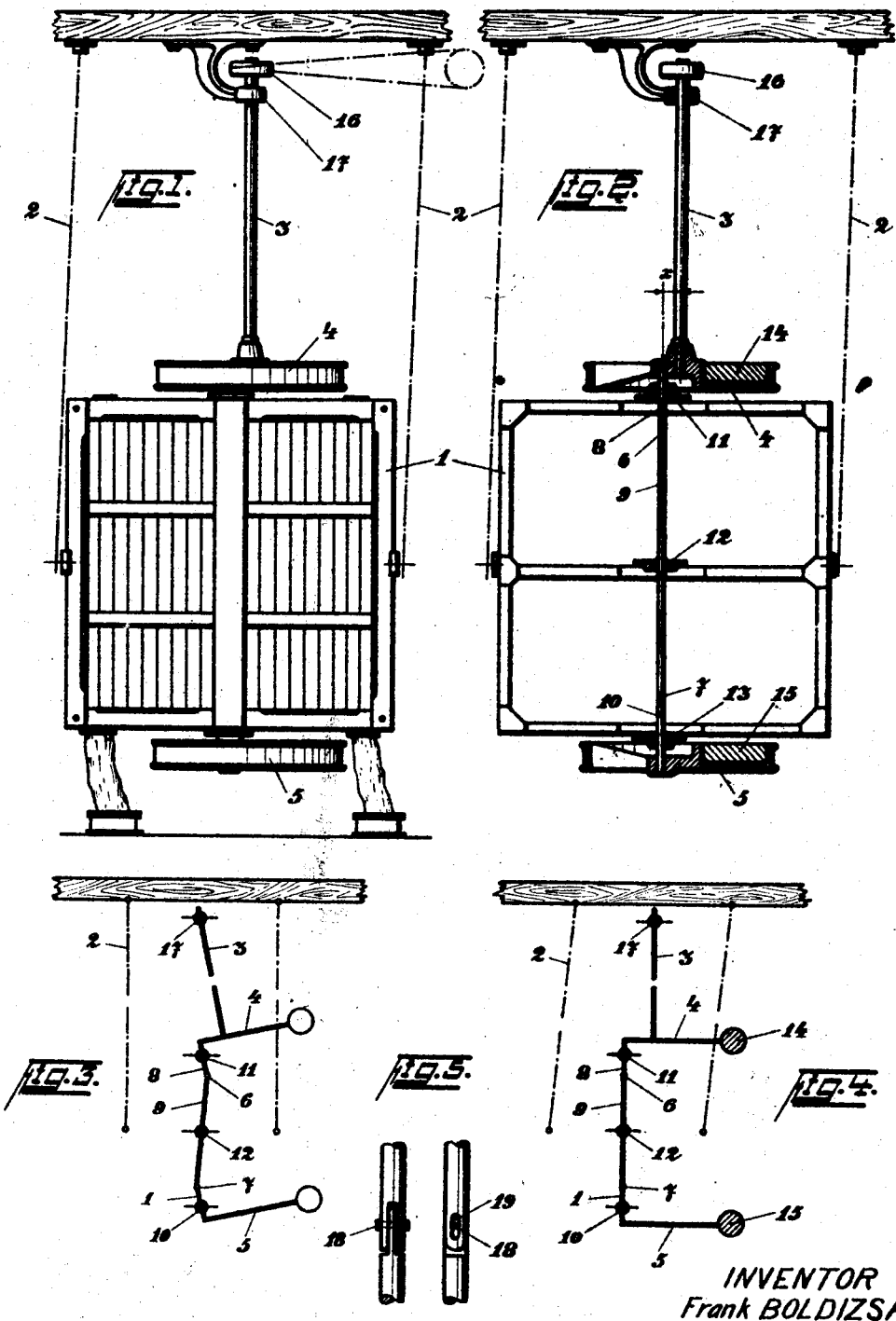
Nov. 25, 1930. F. BOLDIZSÁR 1,782,561
SELF BALANCING PLAN SIFTER
Filed Sept. 4, 1929
INVENTOR
Frank BOLDIZSÁR
by
Attorney Patented Nov. 25, 1930

UNITED STATES PATENT OFFICE

FRANK BOLDIZSÁR, OF RAKOSPALOTA, HUNGARY

SELF-BALANCING PLANSIFTER

Application filed September 4, 1929, Serial No. 390,255, and in Hungary January 14, 1929.

The invention relates to an arrangement on self-balancing plan-sifters in which the counter-balancing (governor) weights are arranged above and below the sieve case on the two ends of a shaft passing through the case.

For the purpose of the invention, an arrangement has to be contrived which ensures perfect running and in particular the starting and stopping of the sieve without shock, which hitherto it has been only possible to incompletely attain with plan-sifters of this type attaching the case to the floor by means of spring shock absorbers.

The essence of the invention consists principally in an improved and suitable construction of the shaft carrying the balancing weights and passing through the centre of gravity of the sieve case. For this purpose, the shaft consists of three parts linked together.

The invention further consists in that for the purpose of connecting the parts of the shaft together resilient links are used, together with self adjusting (swivel) bearings for carrying the separate parts, so that the shaft parts can occupy positions with varying angles with respect to each other.

The principal characteristic of the invention is that the driving shaft of the improved plan-sifter is always in a practically vertical position and consequently the sieve box, both in the position of rest as well as when working, independent of the speed of rotation at the moment, does not move out of its prescribed circular path.

In the drawing, Figure 1 shows a front view and Figure 2 a cross section of the plansifter suspended in the usual manner. Figures 3 and 4 show two diagrams of the drive and counter-balancing apparatus in two different positions. Figure 5 is a detailed drawing of the shaft link on a larger scale.

On the drawing, 1 indicates the sieve box, 2 the suspension bars (reeds), 3 the driving shaft, 4 and 5 the arms formed as discs supporting the upper and lower balance-weights said discs being connected together by means of a shaft composed of the parts 8, 9, 10 linked together by the links 6, 7. These shaft parts are carried on the casing in self-adjusting (swivel) bearings 11, 12, 13, and—when proper balance-weights are used—lie in the line of the centre of gravity of the case, eccentric to the axis of the driving shaft 3. Similarly the balancing weights 14, 15 lie eccentric to this shaft but with a correspondingly greater eccentricity, and arranged on the other end of the arms 4 and 5.

The eccentricity $x$ between driving shaft and the shaft 8, 9, 10 is equal to the radius of the circular path of the sieve case. The driving shaft provided with the belt pulley 16 rotates preferably in a swivel bearing 17 arranged on the ceiling.

The links 6, 7 are, as shown in Figure 5, coupled with eye joints, i. e. the pin 18 is carried in an oblong slot 19 so that a slight axial displacement of the connected parts is made possible. In consequence of this arrangement, as also of the swivel bearings, the shaft parts on the occurrence of a considerable alteration in the weight, can adjust themselves according to the zig zag line as shown in Figure 3.

It is important that the axes of the shafts as also the centre of gravity of the sieve box and of the balancing weights should be in a common plane (the plane of the drawing) and in particular that the links should be so adjusted that the oscillating plane of the shaft parts should coincide with the plane.

The rotating weights 14, 15 are chosen in such manner that the sieve box is fully counter-balanced, and consequently the parts of the drive, both in the standing condition as well as when working, should take up the position shown in Figures 1, 2, and 4 which position corresponds to that occupied in each point of the horizontal circular path of the sieve. The arrangement mentioned of the links and of the bearings permits the driving shaft 3 to remain always vertical and thus a starting and stopping entirely free of shocks as well as perfect running of the sieve box is ensured.

In the diagram according to Figure 3, the balancing weights are assumed to be removed (as shown for example, by the empty circles 14, 15). This diagram shows the adjustment of the separate parts greatly exaggerated for the sake of clearness. The casing would in this case, as no counter balance weights act thereon, take up its lowest position so that the suspension rods 2 assume the vertical position. On the other hand, the driving shaft which is in rigid connection with the arm 4 and the shaft part 8 would, in consequence of the horizontal displacement of the casing 1, take up the inclined position shown and consequently the two other parts of the shaft and the arm 5 also, would adjust themselves in the manner shown. If now the counterweights are inserted (as shown for instance by the shaded circles, 14, 15 Figure 4,) that is, the load increased until the driving shaft 3 assumes the vertical position (Figure 4), then the counter balance position is reached, the shaft parts 8, 9, 10 attain a position parallel to the driving shaft, and the sieve case is brought into its circular orbit in which position it remains unchanged during working.

What I claim and desire to secure by Letters Patent of the United States is:—

1. Arrangement for self balancing plansifters comprising a sieve case, a three part linked shaft passing through said case, self adjusting bearings mounted in said case and carrying said shaft, arms rigidly connected with the ends of said shaft, balance masses arranged on said arms and a rigid driving shaft connected with one of said arms.

2. Arrangement for self balancing plansifters comprising a sieve case, a three part linked shaft passing through said case, self adjusting bearings mounted in said case carrying said shaft, arms rigidly connected with the ends of said shaft, balance masses arranged on said arms and a rigid driving shaft connected with one of said arms at a distance from said three part linked shaft corresponding to the circular path of the sieve.

3. Arrangement for self balancing plansifters comprising a sieve case, a three part linked shaft carried through the centre of gravity of said sieve case, self adjusting bearings mounted in said case and carrying said shaft, arms rigidly connected with the ends of said shaft, balance masses arranged on said arms, and a rigid driving shaft rigidly connected with one of said arms.

4. Arrangement for self balancing plansifters comprising a sieve case, a three part linked shaft the mid point of which lies at the centre of gravity of the sieve case, arms rigidly connected with the ends of said shaft, self adjusting bearings mounted in said case and carrying said shaft, balance masses arranged on said arms, and a rigid driving shaft connected with one of said arms.

5. Arrangement for self balancing plansifters comprising a sieve case, a three part linked shaft passing through said case said parts being connected to allow a relative longitudinal movement thereof, self adjusting bearings mounted in said case and carrying said shaft, arms rigidly connected with the ends of said shaft, balance masses arranged on said arms, and a rigid driving shaft connected with one of said arms.

6. Arrangement for self balancing plansifters comprising a sieve case, a three part linked shaft passing through said case said parts being connected to allow a longitudinal displacement thereof and to oscillate in one plane only, arms carrying balance masses rigidly connected with the ends of said shaft and a rigid driving shaft connected with one of said arms the axes of each of said shafts lying in the plane in which the links are adapted to oscillate.

FRANK BOLDIZSÁR.